3,816,448
Patented June 11, 1974

3,816,448
BIS-(3-IMINO-ISOINDOLINONE)PIGMENTS
Peter Bitterli, Reinach Basel-Land, and Fritz Kehrer, Basel, Switzerland, assignors to Sandoz Ltd., Basel, Switzerland
No Drawing. Filed Aug. 24, 1971, Ser. No. 174,496
Claims priority, application Switzerland, Sept. 15, 1970, 13,648/70, 13,649/70; Sept. 16, 1970, 13,720/70
Int. Cl. C07d 27/50
U.S. Cl. 260—325  3 Claims

ABSTRACT OF THE DISCLOSURE

Sparingly soluble compounds of the general formula

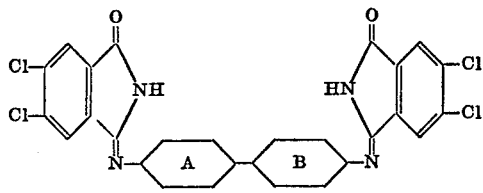

where the nuclei A and B bear chlorine atoms or methyl radicals as substituents are suitable for use as pigments, notably for the mass pigmentation of plastics.

---

This invention relates to sparingly soluble compounds of the formula

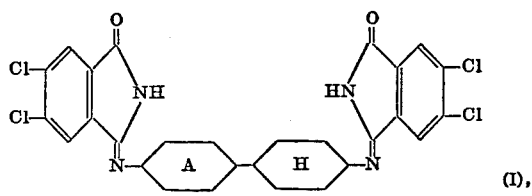

where the nuclei A and B bear chlorine atoms or methyl radicals as substituents. These compounds are eminently suitable for use as pigments, notably for the mass pigmentation of plastics. The two most valuable pigments are of the formula

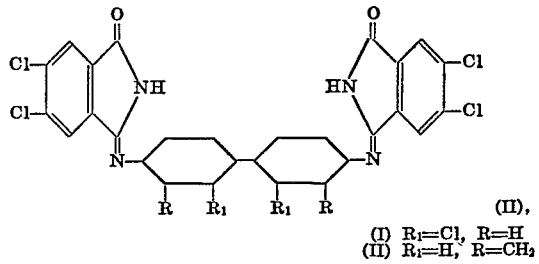

(I) $R_1=Cl$, $R=H$
(II) $R_1=H$, $R=CH_3$

The compounds are produced by reaction of 2 mols of a compound of the formula

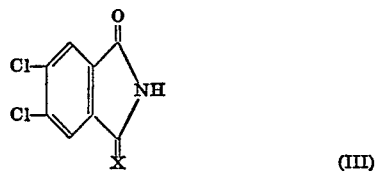

where X stands for NH or $Hal_2$, preferably $Cl_2$ or $Br_2$, with 1 mol of a compound of the formula

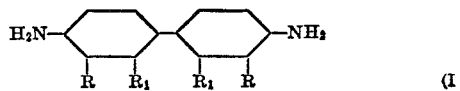

The condensation of compounds of formula (III) in which X represents an imino group is preferably carried out in polar organic solvent, e.g. alcohol, ether alcohol, N-dialkyl acylamide or dimethyl sulphoxide, in the presence of acid which bind the liberated ammonia.

Alternatively, an organic acid, such as glacial acetic acid, which also acts as a solvent can be employed. The condensation reaction can also be carried out with a neutral salt of a diamine of formula (IV) and a strong mono- or multi-functional acid, e.g. the hydrochloric acid or the sulphuric acid.

When X in formula (III) represents halogen, it is preferable to work with an inert solvent such as toluene, nitrobenzene or a chlorobenzene or mixture of such solvents and in the presence of an acid-binding agent, such as alkali acetate, carbonate or bicarbonate, magnesium oxide or pyridine. Generally the reaction is accomplished in the temperature range of 20° C. to 200° C., preferably between 70° C. and 120° C., independently of the meaning of X.

The new iso-indolinone intermediate of formula (III) (X=NH) defined above is obtainable by a new process which consists of the reaction of 4,5-dichlorophthalic acid or 4,5-dichlorophthalic anhydride with urea in the presence of catalytic amounts of salts of a molybdic and/or vanadic acid. The reaction is carried out in the temperature range of 130°–180° C., preferably 140°–150° C., and preferably in an inert organic solvent, such as nitrobenzene or a chlorobenzene. Ammonium molybdate is the preferred catalyst, but alkali molybdates or vanadates can also be used. On completion of the reaction the compound of formula (III) (X=NH) is isolated in the pure state by evaporation of the solvent, or by precipitation, filtration and washing with water.

The compounds of this invention, especially when worked up by standard methods for pigments, are suitable for mass pigmentation of plastics, by which are understood synthetic polymers and synthetic resins containing or free from solvents (oil, water and solvent based surface coatings, viscose rayon and cellulose acetate spinning solutions, polyethylene, polystyrene, polyvinyl chloride, synthetic rubber and synthetic leather). They are also suitable for printing inks, paper dyeing in the stock, and the pigment printing and coating of textiles.

In these applications the inventive pigments show excellent migration resistance and light fastness, with very good fastness to washing, chlorite, hypochlorite and peroxide bleaching, cross dyeing, blind vats, rubbing, overspraying and solvents.

They show good transparency and heat stability and in this respect are superior to similar pigments, as described for example in Swiss Pat. 346,218 and U.S. Pat. 2,537,352.

In the following Examples the parts and percentages are by weight and the temperatures in degrees centigrade.

EXAMPLE 1

A solution of 235 parts of 4,5-dichlorophthalic acid, 180 parts of urea and 2.5 parts of ammonium molybdate in 1000 parts of ortho-dichlorobenzene is reacted for 6 hours at 140°–150° with stirring. Carbon dioxide, ammonia and water escape during the reaction. Subsequently the solution is cooled to 100°, on which the product precipitates. It is filtered, washed with methanol and then with water, and dried, e.g., in vacuum at 60°. The 5,6-dichloro-3-imino-iso-indolinone is obtained in a high degree of purity.

EXAMPLE 2

A solution of 47 parts of 5,6-dichloro-3-imino-indolinone and 28.5 parts of 3,3'-dimethyl-4,4'-diaminodiphenyl hydrochloride in 400 parts of dimethyl formamide is reacted for 3 hours at 100° with thorough stirring. The yellow precipitate formed is filtered hot, washed with dimethyl formamide and then with water, and dried. It is dissolved in a mixture of 500 parts of ethyl alcohol and 25 parts of 33% sodium hydroxide solution at 60°, activated carbon is added, the solution is stirred for a short time and then filtered. The product is precipitated from the filtrate by acidification with 15 parts of glacial acetic acid, filtered hot, washed with ethyl alcohol and water, and dried at 100°.

The reddish yellow pigment thus obtained is of the formula

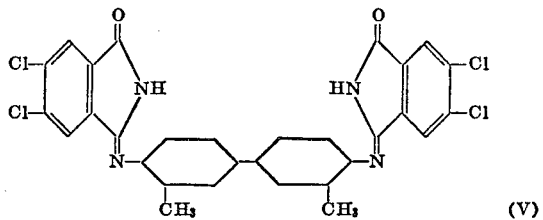

(V)

It is of high tinctorial strength and is very suitable for pigmenting plastics and surface coatings, in which it shows notably good light fastness, heat stability, overspraying and migration resistance.

EXAMPLE 3

A solution of 47 parts of 5,6-dichloro-3-imino-isoindolinone and 32.6 parts of 2,2'-dichloro-4,4'-diaminodiphenyl hydrochloride in 450 parts of dimethyl formamide is reacted for 4 hours at 100° with thorough stirring. A yellow product precipitates and is filtered hot, washed with dimethyl formamide and then with water, and dried. It is dissolved in a mixture of 500 parts of ethyl alcohol and 25 parts of 33% sodium hydroxide solution at 60°, with the subsequent addition of activated carbon. The solution is stirred for a short time and filtered, the product precipitated from solution by the addition of 15 parts of acetic acid, filtered hot, washed with ethyl alcohol and water, and dried at 100°.

A strong greenish yellow pigment is obtained which is of the formula

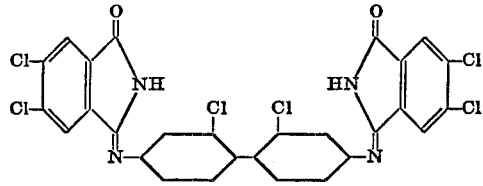

This pigment is highly suitable for application in plastics and surface coating systems, in which it has very good light fastness, heat stability, migration and overspraying fastness.

Having thus disclosed the invention what we claim is:

1. A sparingly soluble heterocyclic compound of the formula

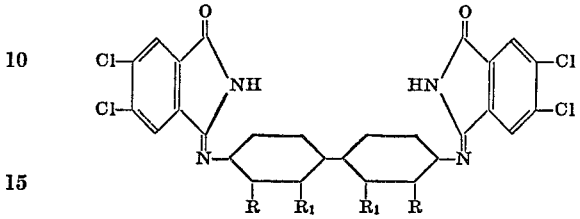

where either $R_1$ stands for chlorine and R for hydrogen or $R_1$ for hydrogen and R for the methyl radical.

2. The sparingly soluble heterocyclic compound of the formula

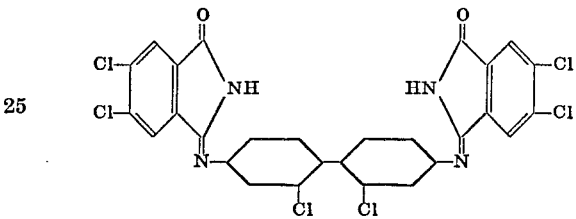

3. The sparingly soluble heterocyclic compound of the formula

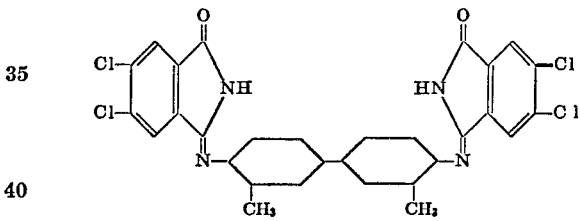

References Cited
UNITED STATES PATENTS

| | | | |
|---|---|---|---|
| 2,537,352 | 1/1951 | Jones | 260—325 |
| 2,973,358 | 2/1961 | Pugin | 260—240 |

JOSEPH A. NARCAVAGE, Primary Examiner

U.S. Cl. X.R.

106—23, 288 Q; 260—37 P, 41 C, 41.5 R